United States Patent
Gambach et al.

(10) Patent No.: US 8,453,814 B2
(45) Date of Patent: Jun. 4, 2013

(54) MOTOR ACTIVATION CIRCUIT FOR A RAIL VEHICLE AND METHOD FOR THE OPERATION THEREOF

(75) Inventors: Herbert Gambach, Uttenreuth (DE); Martin Glinka, Uttenreuth (DE); Ulrich Wenkemann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 199 days.

(21) Appl. No.: 12/921,515

(22) PCT Filed: Mar. 2, 2009

(86) PCT No.: PCT/EP2009/052441
§ 371 (c)(1),
(2), (4) Date: Sep. 8, 2010

(87) PCT Pub. No.: WO2009/112389
PCT Pub. Date: Sep. 17, 2009

(65) Prior Publication Data
US 2011/0011300 A1    Jan. 20, 2011

(30) Foreign Application Priority Data

Mar. 13, 2008  (DE) .......................... 10 2008 014 571

(51) Int. Cl.
*B60L 1/00* (2006.01)
(52) U.S. Cl.
USPC ........................................................... 191/3
(58) Field of Classification Search
USPC ............... 191/2–5, 7, 8; 322/5, 6, 14; 363/13, 363/15, 16
See application file for complete search history.

(56) References Cited

U.S. PATENT DOCUMENTS 7,451,842 B2   11/2008  Hemmi et al.
2006/0034357 A1*  2/2006  Ylppo et al. .................. 375/219

FOREIGN PATENT DOCUMENTS

DE            3826283  A1      2/1990

(Continued)

OTHER PUBLICATIONS

M. M. Bakran, et al., "Comparison of Multi-System Traction Converts for High-Power Locomotives," IEEE Power Electronics Specialists Conference, 2004, pp. 697-703, Aachen, Germany.

*Primary Examiner* — R. J. McCarry, Jr.
(74) *Attorney, Agent, or Firm* — Laurence A. Greenberg; Werner H. Stemer; Ralph E. Locher

(57) ABSTRACT

A motor drive circuit for a rail vehicle has a step-up converter, which is disposed at the input of the motor drive circuit, and which converts a mains DC voltage, at the input of the motor drive circuit into an intermediate circuit DC voltage. A pulse rectifier, which is downstream from the step-up converter, can be connected at the output to a drive motor of the rail vehicle and it is capable of converting the intermediate circuit DC voltage of the step-up converter into a motor drive voltage for driving the drive motor. A control unit activates the step-up converter in operation such that the converter generates the predetermined rated intermediate circuit DC voltage for a mains DC voltage below a predetermined rated intermediate circuit DC voltage as the intermediate circuit DC voltage. The control unit is designed such that it activates the step-up converter for a mains DC voltage above the rated intermediate circuit DC voltage such that the converter generates an intermediate circuit DC voltage identical to the mains DC voltage or an intermediate circuit DC voltage, which is greater at most by a predetermined offset value, and feeds the intermediate circuit DC voltage into the pulse rectifier.

11 Claims, 7 Drawing Sheets

FOREIGN PATENT DOCUMENTS

| | | | |
|---|---|---|---|
| DE | 3817652 | C2 | 4/1992 |
| EP | 0300392 | A2 | 1/1989 |
| EP | 0621679 | * | 10/1994 |
| EP | 0621679 | A1 | 10/1994 |
| EP | 1724147 | A2 | 11/2006 |
| RU | 2013230 | C1 | 5/1994 |
| RU | 2027616 | C1 | 1/1995 |
| SU | 1069112 | A | 1/1984 |

* cited by examiner

MOTOR ACTIVATION CIRCUIT FOR A RAIL VEHICLE AND METHOD FOR THE OPERATION THEREOF

BACKGROUND OF THE INVENTION

Field of the Invention

The invention relates to a motor drive circuit for a rail vehicle having a step-up converter, which is arranged at the input of the motor drive circuit and converts a power supply system DC voltage, which is applied to the input side of the motor drive circuit, to an intermediate-circuit DC voltage, a pulse-controlled inverter, which is connected downstream from the step-up converter, can be connected on the output side to a drive motor for the rail vehicle and is suitable for converting the intermediate-circuit DC voltage of the step-up converter to a motor drive voltage for driving the drive motor, and a control device, which drives the step-up converter in operation such that it produces the predetermined rated intermediate-circuit DC voltage as the intermediate-circuit DC voltage for a power supply system DC voltage below a predetermined rated intermediate-circuit DC voltage.

Until now, very different converter concepts have been used for feeding rail vehicles from DC voltage power supply systems. By way of example, the RENFE (Spanish railways) circuit, the double-star circuit, the three-point circuit and the series circuit of choppers may be mentioned in this context. Said circuits are described in more detail, by way of example, in the publication "Comparison of Multi-System Traction Converters for High-Power Locomotives" (M. M. Bakran, H.-G. Eckel, P. Eckert, H. Gambach and U. Wenkemann, as a conference lecture at the PESC 2004 conference (PESC: Power Electronics Specialists Conference and Exhibition)). Said circuits are distinguished in that the power supply input voltage is split between two series-connected semiconductors.

New concepts which are profiting from the considerably improved blocking capability of modern IGBTs that has been available for some years are based on a circuit arrangement in which the pulse-controlled inverter is used directly on the power supply input voltage, simply with the interposition of an LC filter. Use of the pulse-controlled inverter directly on the DC power supply system with the interposition of a filter is likewise described in the already mentioned publication "Comparison of Multi-System Traction Converters for High-Power Locomotives".

A further concept, which is likewise profiting from the considerably improved blocking capability of modern IGBTs that has been available for some years, is based on a circuit arrangement in which the input converter can be switched between a step-up converter arrangement and a step-down converter arrangement, depending on the rated value of the power supply system voltage. By way of example, FIG. 1 shows a circuit arrangement such as this in the step-down converter mode, and FIG. 2 shows the same circuit arrangement in the step-up converter mode.

If the power supply system input voltages which are used do not overlap, then the choice of the rated intermediate-circuit DC voltage with the last-mentioned circuit concept falls in a range below the minimum value of the power supply system voltage of a DC voltage power supply system with a high rated value and above the maximum value of the power supply system voltage of a DC voltage power supply system with a low rated value. However, in the end, this choice of the rated intermediate-circuit DC voltage means that the performance of the motor drive circuit is not fully exploited either on the input side or on the output side.

BRIEF SUMMARY OF THE INVENTION

The invention is accordingly based on the object of specifying a motor drive circuit for a rail vehicle which avoids the stated disadvantages.

According to the invention, this object is achieved by a motor drive circuit as claimed. Advantageous refinements of the invention are specified in the dependent claims.

Against the background of the motor drive circuit described initially, the invention provides that the control device is designed such that it drives the step-up converter for a power supply system DC voltage above the rated intermediate-circuit DC voltage such that the step-up converter, on the output side, produces an intermediate-circuit DC voltage which is identical to the power supply system DC voltage, or an intermediate-circuit DC voltage which is at most greater by a predetermined offset value, and feeds this intermediate-circuit DC voltage to the pulse-controlled inverter.

One major advantage of the invention is that there is no need for a step-down converter, as a result of which there is no need for input-side reconfiguration of the motor drive circuit from a step-up converter mode to a step-down converter mode, or vice versa—in contrast to the prior art as described above—for the motor drive circuit according to the invention, to be precise neither in the case of DC voltage power supply systems with a low rated value of the power supply system DC voltage nor in DC voltage power supply systems with a high rated value of the power supply system DC voltage.

A further major advantage of the invention is that the design of the motor drive circuit is considerably simplified by the use of a single step-up converter instead of a switchable converter combination comprising a step-up converter and a step-down converter, since only a single low-inductance intermediate circuit is required, and not, as in the case of the converter combination with a step-up converter and a step-down converter, two low-inductance intermediate circuits, which must be operated individually or connected in parallel, depending on the converter choice.

When the values of the power supply system DC voltage are above the rated intermediate-circuit DC voltage, the intermediate-circuit DC voltage of the step-up converter can be adjusted particularly easily and therefore advantageously either by setting the clock drive for the step-up converter by means of the control device or by successively switching to very low values of the clock frequency.

The motor drive circuit semiconductor switches which are used for DC voltage operation or DC operation may be obtained, for example, by regrouping of semiconductor switches which are required for AC voltage operation or AC operation. One example: if the motor drive circuit is equipped with two four-quadrant converters for AC operation, the four phases of the four-quadrant converter modules can simply be reconfigured for DC operation with a step-up converter, in order to allow step-up converter operation. For example, in DC operation, two phases of the four-quadrant converter modules are used as a step-up converter, and the two other phases of the four-quadrant converter modules are used as a braking converter.

According to one preferred refinement of the motor drive circuit, the control device is designed such that the offset value corresponds to a minimum offset value required as a minimum for operation of the step-up converter, and/or the magnitude of the offset value is less than 10% of the power supply system DC voltage.

Preferably, the motor drive circuit is suitable for processing at least two different rated DC voltages with which two permissible voltage fluctuation ranges are in each case associated according to a standard, wherein the magnitude of the rated intermediate-circuit DC voltage is preferably greater than each of the two rated DC voltages, but is within the permissible voltage fluctuation range of the greater rated DC voltage.

By way of example, the greater rated DC voltage may be 3.0 kV and the associated voltage fluctuation range may be between 2.0 kV and 3.9 kV; the lesser rated DC voltage may, for example, be 1.5 kV and the associated voltage fluctuation range may be between 1.0 kV and 1.95 kV (for example in accordance with the standards DIN EN 50163, EN 50163 or UIC600).

The invention is also considered to cover a rail vehicle having at least one drive motor and at least one motor drive circuit designed on the basis of the above aspects.

Furthermore, the invention relates to a method for driving a drive motor of a rail vehicle, in which a check is carried out to determine whether a power supply system DC voltage which is present on the input side is less than a predetermined rated intermediate-circuit DC voltage, and, if a power supply system DC voltage is below the predetermined rated intermediate-circuit DC voltage, the predetermined rated intermediate-circuit DC voltage is produced by a step-up converter as the intermediate-circuit DC voltage, and the intermediate-circuit DC voltage is used to produce a motor drive voltage for driving the drive motor.

With respect to a method such as this, the invention proposes that if the power supply system DC voltage is greater than the rated intermediate-circuit DC voltage, the same step-up converter as that used for the intermediate-circuit DC voltage is used to produce a voltage which is identical to the power supply system DC voltage, or a voltage which is greater at most by a predetermined offset value.

With respect to the advantages of the method according to the invention, reference should be made to the above statements relating to the motor drive circuit according to the invention.

Preferably, either of at least two predetermined different rated DC voltages is processed, with each of which two permissible voltage fluctuation ranges are associated according to a standard, wherein the rated intermediate-circuit DC voltage is preset such that it is greater than each of the two rated DC voltages but is within the permissible voltage fluctuation range of the greater rated DC voltage.

The invention will be explained in more detail in the following text with reference to exemplary embodiments, and in this case, by way of example:

DESCRIPTION OF THE INVENTION

For the sake of clarity, the same reference symbols are always used for identical or comparable components in the figures.

Figure 1:
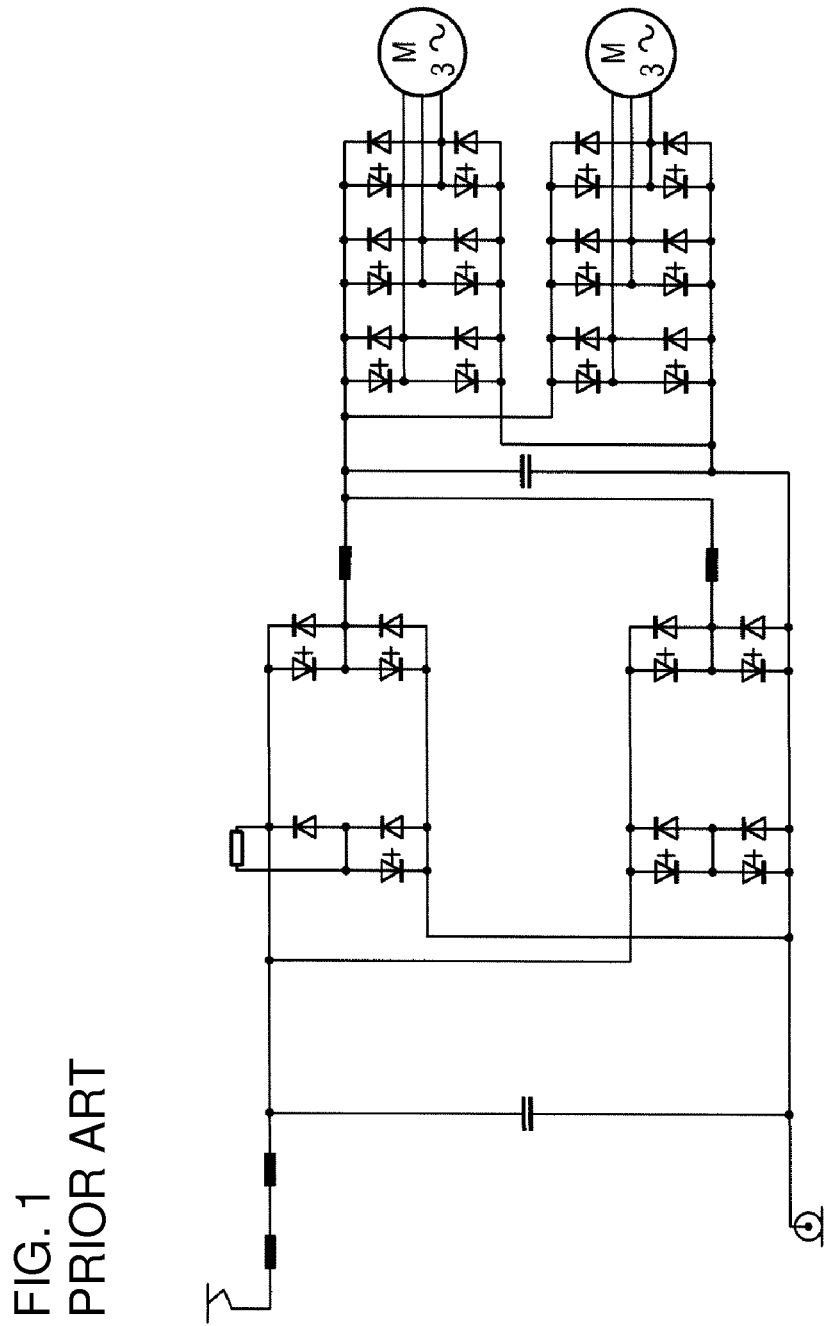
FIG. 1 shows a prior art circuit arrangement with an input converter switched in the step-down converter mode.
Figure 2:
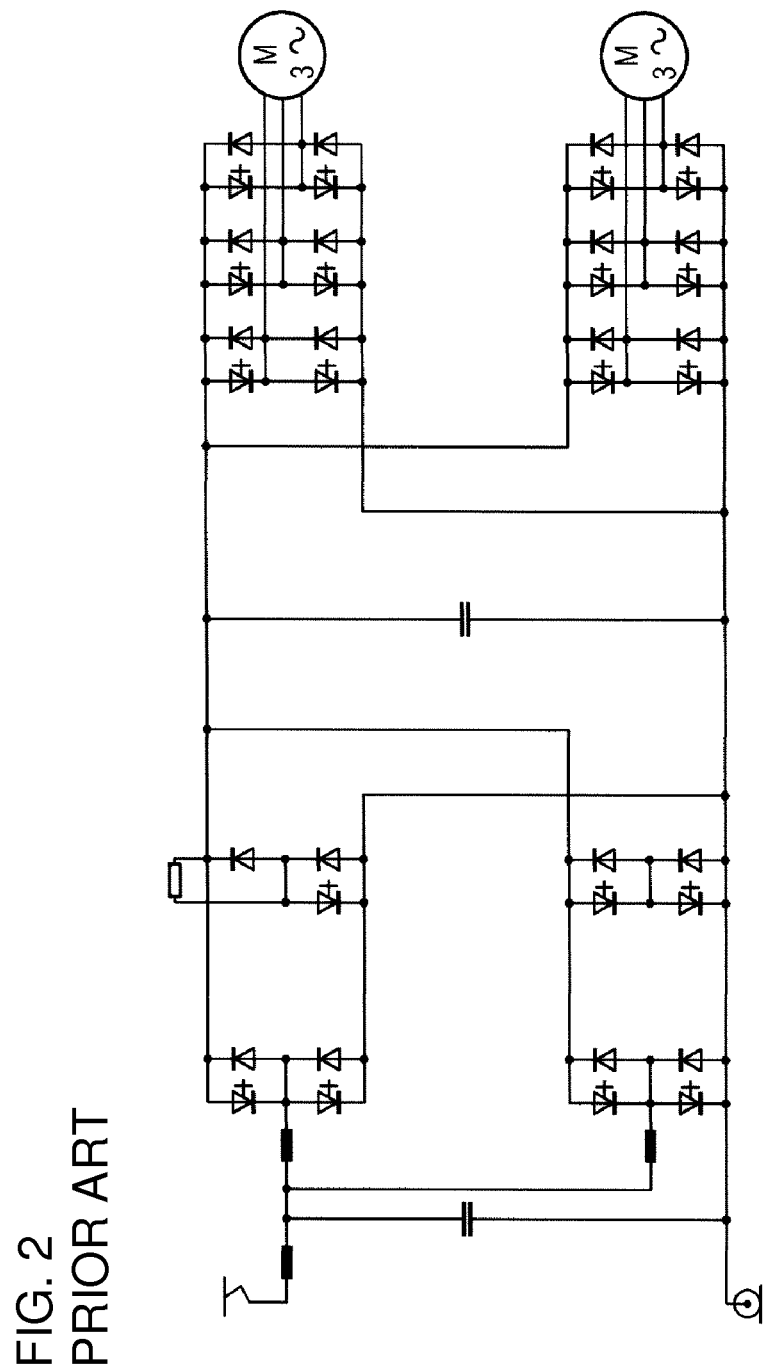
FIG. 2 shows the prior art circuit arrangement with the input converter switched in the step-up converter mode.
Figure 3:
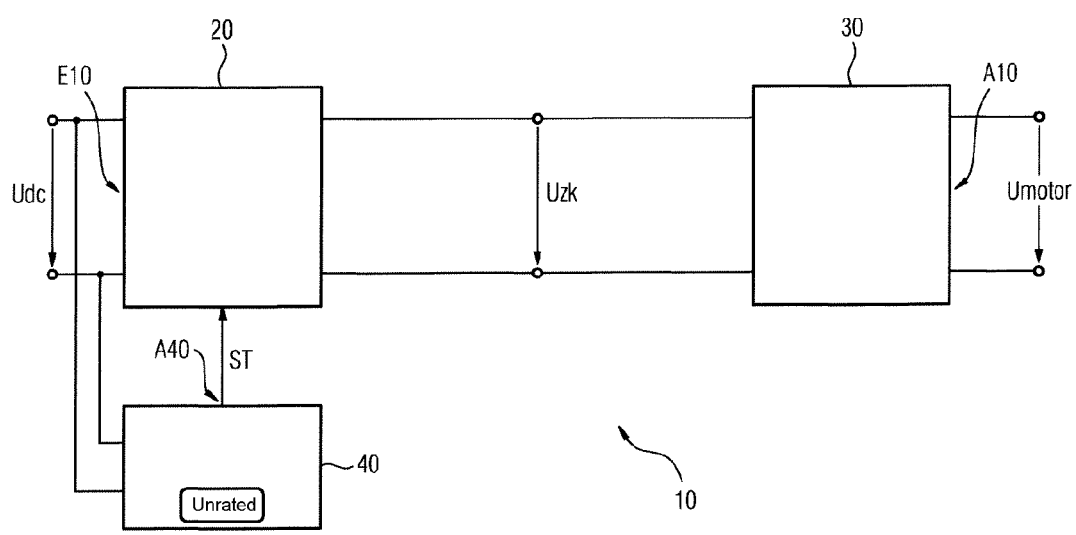
FIG. 3 shows one exemplary embodiment of a motor drive circuit according to the invention.

FIG. 3 shows a motor drive circuit 10 to whose input E10 a power supply system DC voltage Udc is applied. At an output A10 on the output side, the motor drive circuit 10 produces a motor drive voltage which is identified by the reference symbol Umotor, and which may, for example, be a polyphase voltage.

The motor drive circuit 10 has a step-up converter 20 on the input side, which is followed by a pulse-controlled inverter 30. The step-up converter 20 is driven by a control device 40 in which a rated intermediate-circuit DC voltage Urated is predetermined such that it is fixed or is variable within certain limits.

On the input side, the control device 40 is connected indirectly or directly to the input E10 of the motor drive circuit 10, such that the power supply system DC voltage Udc or a measured value which corresponds to the power supply system DC voltage Udc, is also available for the control device 40.

At the output A40, the control device 40 produces a control signal ST which may, for example, be a pulse-width-modulated clock signal and is used to drive the step-up converter 20 such that it produces an intermediate-circuit DC voltage Uzk from the power supply system DC voltage Udc on the input side. The intermediate-circuit DC voltage Uzk is therefore applied to the inverter 30 which, on the output side, produces the already mentioned motor drive voltage Umotor.

The control device 40 is designed such that it drives the step-up converter 20 and produces the control signal ST as a function of the power supply system DC voltage Udc which is applied to the input E10 of the motor drive circuit 10: The control device 40 therefore produces the control signal ST such that, in the case of a power supply system DC voltage Udc<Urated, the predetermined rated intermediate-circuit DC voltage Urated is produced dynamically as the intermediate-circuit DC voltage Uzk; for a power supply system DC voltage Udc≧Urated, the control device 40 drives the step-up converter 20 such that it produces an intermediate-circuit DC voltage Uzk which corresponds to the applied power supply system DC voltage Udc. Therefore:

| Uzk = Urated | for Udc < Urated and |
|---|---|
| Uzk = Udc + Uoffset | for Udc ≧ Urated | where Uoffset is an offset voltage whose magnitude is in a range between 0 and 10% of the value of Udc (−Udc/10≦offset≦Udc/10). The value Uoffset can be specifically preset by the user or else can be obtained solely from the technical characteristics of the step-up converter 20: For technical reasons, in most step-up converters 20, the minimum voltage at the output of the step-up converter is always slightly greater than the input voltage applied to the input of the step-up converter; the offset voltage Uoffset takes account of this in the above equations.

Figure 4:
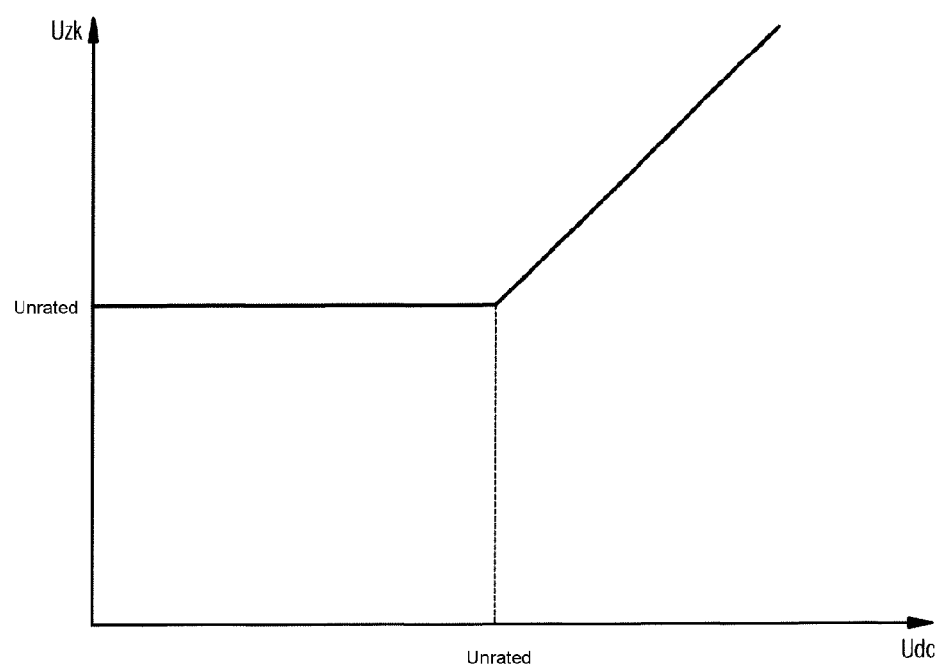
FIG. 4 shows the profile of the intermediate-circuit DC voltage as a function of the power supply system DC voltage applied on the input side, for the motor drive circuit shown in FIG. 3.

The profile of the intermediate-circuit DC voltage Uzk which is produced dynamically by the step-up converter 20 is illustrated in FIG. 4, by way of example, as function of the power supply system DC voltage Udc applied on the input side. In order to assist understanding, FIG. 4 is based by way of example on an offset voltage Uoffset of 0 V.

If the motor drive circuit is used, of example, in multiple system locomotives which can be operated not only with DC voltage but also with AC voltage, then it is considered advantageous for the components of the motor drive circuit which are required for DC voltage operation or DC operation of the multiple-system locomotives to be obtained by circuitry regrouping of components which are required in any case for DC voltage operation or AC operation. By way of example, such regrouping is carried out by reconfiguring the motor drive circuit with a plurality of contactors and switches, depending on the chosen operating mode, for DC operation or AC operation.

Figure 5:
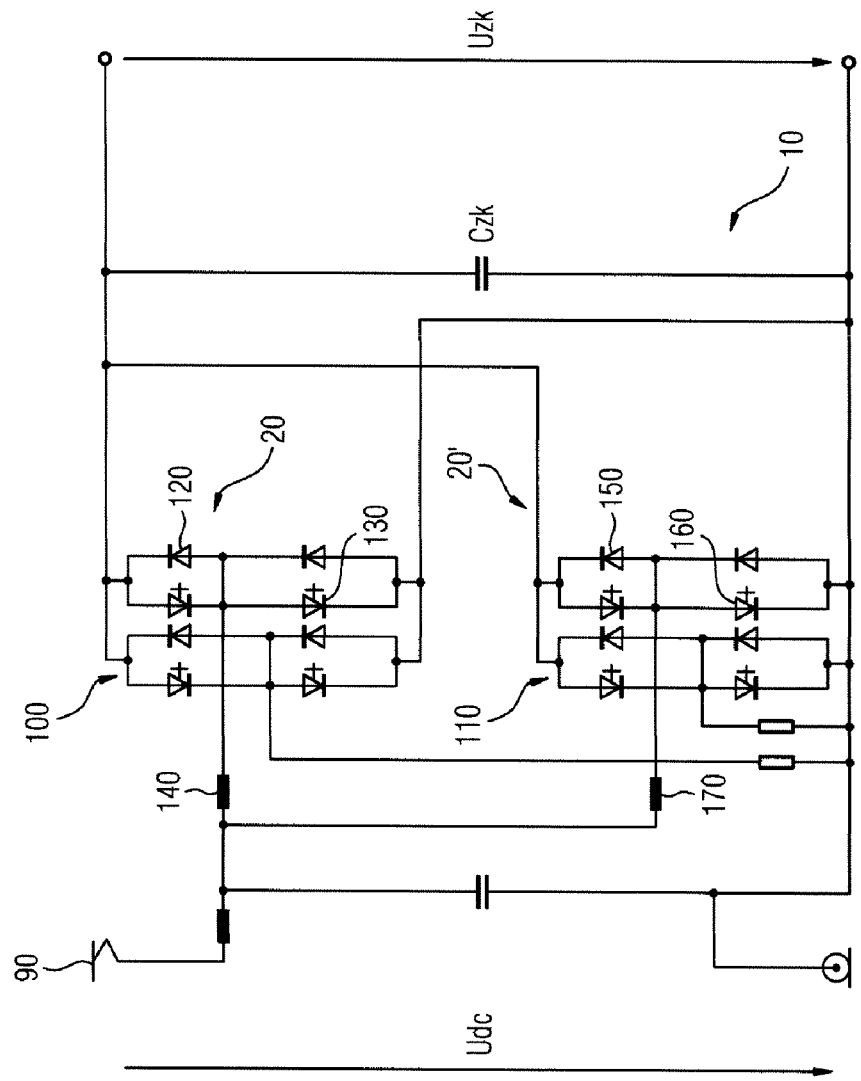
FIG. 5 shows a further exemplary embodiment of a motor drive circuit according to the invention, in which there are two step-up converters which are formed by components of four-quadrant converters.
Figure 6:
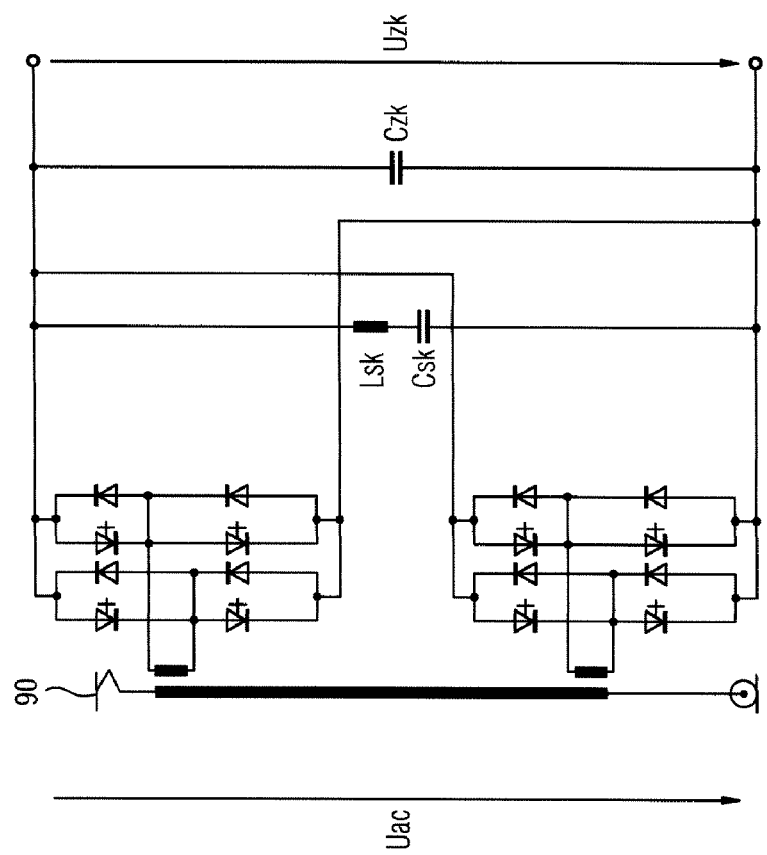
FIG. 6 shows the motor drive circuit shown in FIG. 5 with a different configuration for processing of an AC voltage which is applied on the input side.

FIGS. 5 and 6 show one exemplary embodiment of a reconfigurable motor drive circuit 10, which can be reconfigured by means of switches and contactors, which are not illustrated in the figures, both for AC voltage operation and for DC voltage operation. The configuration of the motor drive circuit 10 for DC voltage operation is shown in FIG. 5, and the configuration for AC voltage configuration is shown in FIG. 6.

The motor drive circuit 10 is connected to an overhead wire 90 and has, inter alia, two four-quadrant converters 100 and 110 which are used both for AC voltage operation and for DC voltage operation: In DC voltage operation (cf. FIG. 5), only sub-components of the four-quadrant converters 100 and 110 are used, in order to form two step-up converters 20 and 20', which operate in parallel. The upper step-up converter 20 uses a freewheeling diode 120 and a switch 130 in the four-quadrant converter 100, as well as an inductance 140; the lower step-up converter 20' uses a freewheeling diode 150 and a switch 160 in the four-quadrant converter 110, as well as an inductance 170. The two step-up converters 20 and 20' also include, inter alia, the common intermediate-circuit capacitance Czk.

Only two phases of the two four-quadrant converters 100 and 110 are therefore used for step-up converter operation, as a result of which the two other phases can be used as braking converters during DC voltage operation of the motor drive circuit; the use of a braking converter is, of course, merely optional.

Figure 7:
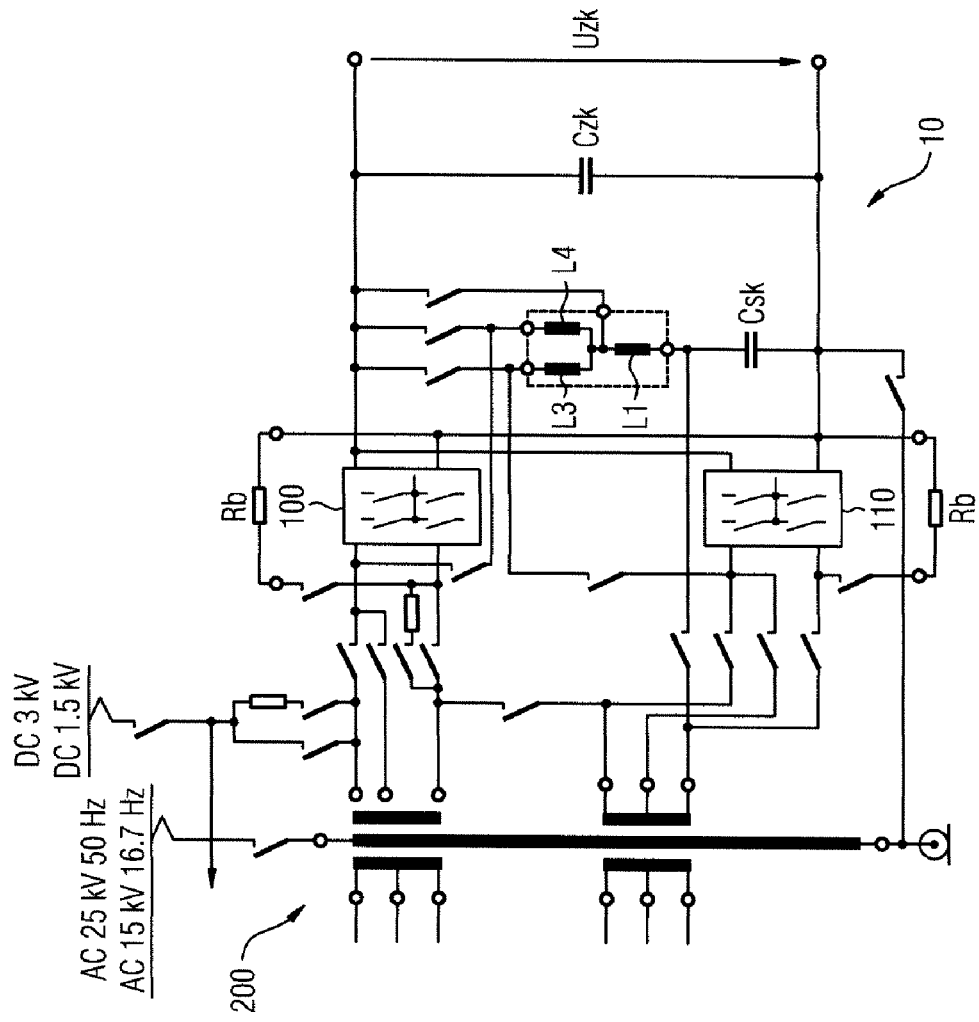
FIG. 7 shows a further exemplary embodiment of a motor drive circuit according to the invention, in which both DC voltage operation and AC voltage operation are possible, and step-up converters are formed by components of four-quadrant converters.

FIG. 7 shows a further exemplary embodiment of a reconfigurable motor drive circuit 10, which is designed specifically for use in a multiple-system locomotive. The motor drive circuit has a transformer 200, four-quadrant converters 100 and 110 as well as a multiplicity of further components, which are switched on and off by switches and contractors for the various operating modes of the multiple-system locomotive, and therefore lead to the respectively desired configuration of the motor drive circuit 10. Both DC voltage operation and AC voltage operation of multiple-system locomotives is therefore possible by appropriate connection of the components in the motor drive circuit 10.

During DC voltage operation, the four-quadrant converters are preferably connected as a braking converter and as a step-up converter. By way of example, the traction windings can be reconfigured, together with the suction circuit capacitor Csk and the suction circuit inductor, which is formed by the inductances L1, L3 and L4, as a DC voltage input filter. In order to further simplify the suction circuit inductor, it is also possible, for example, to integrate the inductance L1 in one of the inductors L3 or L4.

The motor drive circuits shown in FIGS. 3 to 7 are preferably designed such that they can process at least two different rated DC voltages specifically both a rated DC voltage of Udc,rated=1.5 kV and a rated DC voltage of Udc,rated=3.0 kV, as a result of which the motor drive circuits allow the rail vehicle to be operated in accordance with at least one of the standards DIN EN 50163, EN 50163 or UIC600. The rated intermediate-circuit DC voltage Urated, which is preset in the control device 40 as shown in FIG. 3, is in this case preferably of a magnitude which is greater than each of the two rated DC voltages of 1.5 kV and 3.0 kV, but is within the permissible voltage fluctuation range of the greater rated DC voltage. In the case of a rated DC voltage of 3.0 kV, the voltage fluctuation range is, according to a standard, 2.0 kV to 3.9 kV, as a result of which the predetermined rated intermediate-circuit DC voltage Urated is preferably in a range between 3.0 kV and 3.9 kV. For example, the rated intermediate-circuit DC voltage may be in a range between 3.2 kV and 3.7 kV and, for example, may be 3.5 kV.

LIST OF REFERENCE SYMBOLS

| | |
|---|---|
| 10 | Motor drive circuit |
| 20, 20' | Step-up converter |
| 30 | Pulse-controlled inverter |
| 40 | Control device |
| 90 | Overhead wire |
| 100, 110 | Four-quadrant converter |
| 120 | Freewheeling diode |
| 130 | Switch |
| 140 | Inductance |
| 150 | Freewheeling diode |
| 160 | Switch |
| 170 | Inductance |
| 200 | Transformer |
| E10 | Input |
| A10 | Output of the motor drive circuit |
| A40 | Output of the control device |
| Czk | Intermediate-circuit capacitance |
| Csk | Capacitance |
| Rb | Resistor |
| Lsk, L1 | Inductors |
| L3, L4 | Inductors |
| ST | Control signal |
| Udc | Power supply system DC voltage |
| Umotor | Motor drive voltage |
| Urated | Rated intermediate-circuit DC voltage |
| Uoffset | Offset value |
| Uzk | Intermediate-circuit DC voltage |
| Uac | AC voltage |

The invention claimed is:

1. A motor drive circuit for a rail vehicle, comprising:
an input for receiving a power supply system DC voltage;
a step-up converter connected at said input of the motor drive circuit and configured to convert the power supply system DC voltage at said input to an intermediate-circuit DC voltage, wherein said intermediate-circuit DC voltage is equal to or greater than the power supply system DC voltage, and wherein said step-up converter is a DC-DC converter;
a pulse-controlled inverter having an input connected to an output of said step-up converter and an output to be connected to a drive motor for the rail vehicle, said pulse-controlled inverter being configured for converting the intermediate-circuit DC voltage of said step-up converter to a motor drive voltage for driving the drive motor; and a control device connected to drive said step-up converter in operation, wherein:

in case the power supply system DC voltage lies below a rated intermediate-circuit DC voltage, said control device drives said step-up converter to produce the predetermined rated intermediate-circuit DC voltage as the intermediate-circuit DC voltage; and in case the power supply system DC voltage lies above the rated intermediate-circuit DC voltage, said control device drives said step-up converter to produce an intermediate-circuit DC voltage identical to the power supply system DC voltage, or to output an intermediate-circuit DC voltage that is greater than the power supply system DC voltage at most by a predetermined offset value; and the intermediate-circuit DC voltage is output to said pulse-controlled inverter.

2. The motor drive circuit according to claim 1, wherein said control device is configured to set the offset value to correspond to a minimum offset value required as a minimum for operation of the step-up converter, and/or to a magnitude less than 10% of the power supply system DC voltage.

3. The motor drive circuit according to claim 1, wherein
the motor drive circuit is configured for processing at least two different rated DC voltages with which two permissible voltage fluctuation ranges are in each case associated according to a standard, wherein
a magnitude of the rated intermediate-circuit DC voltage is greater than each of the two rated DC voltages, but is within the permissible voltage fluctuation range of the greater rated DC voltage.

4. The motor drive circuit according to claim 3, wherein the greater rated DC voltage is 3.0 kV, and the associated voltage fluctuation range lies between 2.0 kV and 3.9 kV.

5. The motor drive circuit according to claim 4, wherein a lesser rated DC voltage is 1.5 kV, and the associated voltage fluctuation range lies between 1.0 kV and 1.95 kV.

6. The motor drive circuit according to claim 3, wherein a lesser rated DC voltage is 1.5 kV, and the associated voltage fluctuation range lies between 1.0 kV and 1.95 kV.

7. A rail vehicle, comprising at least one drive motor and at least one motor drive circuit according to claim 1.

8. A method of driving a drive motor of a rail vehicle, the method which comprises:

determining whether or not a power supply system DC voltage at an input side is less than a predetermined rated intermediate-circuit DC voltage, and, if the power supply system DC voltage lies below the predetermined rated intermediate-circuit DC voltage, producing the predetermined rated intermediate-circuit DC voltage as an intermediate-circuit DC voltage at an output of a step-up converter formed as a DC-DC converter; and using the intermediate-circuit DC voltage to produce a motor drive voltage for driving the drive motor; and if the power supply system DC voltage is greater than the rated intermediate-circuit DC voltage, using the said step-up converter to produce a voltage identical to the power supply system DC voltage, or a voltage that is greater than the power supply system DC voltage no more than by a predetermined offset value.

9. The method according to claim 8, which comprises:
determining a minimum offset value required as a minimum for operation of the step-up converter, and
setting the offset value to correspond to the minimum offset value; and/or
setting a magnitude of the offset value to be less than 10% of the power supply system DC voltage.

10. The method according to claim 8, wherein
processing either of at least two predetermined different rated DC voltages, with each of the two permissible voltage fluctuation ranges being associated according to a standard, wherein
the rated intermediate-circuit DC voltage is preset such that it is greater than each of the two rated DC voltages but is within the permissible voltage fluctuation range of a greater rated DC voltage.

11. The method according to claim 10, wherein at least one of the following is true:
the greater rated DC voltage is 3.0 kV and the associated voltage fluctuation range lies between 2.0 kV and 3.9 kV; and
the lesser rated DC voltage is 1.5 kV and the associated voltage fluctuation range lies between 1.0 kV and 1.95 kV.

* * * * *